United States Patent [19]

Lichtin et al.

[11] Patent Number: 5,137,703

[45] Date of Patent: * Aug. 11, 1992

[54] THERMAL CATALYTIC METHODS FOR CONVERTING OXIDES OF NITROGEN INTO ENVIRONMENTALLY COMPATIBLE PRODUCTS

[75] Inventors: Norman N. Lichtin, Newton Center; Kallambella M. Vijayakumar; Junchang Dong, both of Brookline, all of Mass.

[73] Assignee: Trustees of Boston University, Boston, Mass.

[*] Notice: The portion of the term of this patent subsequent to Dec. 25, 2007 has been disclaimed.

[21] Appl. No.: 589,104

[22] Filed: Sep. 27, 1990

Related U.S. Application Data

[63] Continuation-in-part of Ser. No. 371,172, Jun. 26, 1989, Pat. No. 4,980,040.

[51] Int. Cl.⁵ .............................................. C01B 21/02
[52] U.S. Cl. .............................. 423/239; 423/351
[58] Field of Search ............................ 423/239, 351

[56] References Cited

U.S. PATENT DOCUMENTS

| | | | |
|---|---|---|---|
| 3,545,917 | 12/1970 | Stephens | 423/239 |
| 3,552,913 | 1/1971 | Stephens | 423/239 |
| 3,801,697 | 4/1974 | Kobylinski et al. | 423/239 |
| 3,857,921 | 12/1974 | Tamura et al. | 423/239 |
| 3,885,019 | 5/1975 | Matsushita et al. | 423/239 A |
| 4,117,081 | 9/1978 | Inaba et al. | 423/239 |
| 4,157,316 | 6/1979 | Thompson et al. | |
| 4,294,726 | 10/1981 | Bozon et al. | |
| 4,299,734 | 11/1981 | Fujitani et al. | |
| 4,587,231 | 5/1986 | Sawamura et al. | |
| 4,656,148 | 4/1987 | Bühler et al. | 423/239 |
| 4,782,039 | 11/1988 | Lindsey | 423/239 |
| 4,792,439 | 12/1988 | Schneider et al. | 423/239 |
| 4,811,555 | 3/1989 | Bell | |
| 4,812,296 | 3/1989 | Schmelz et al. | 423/239 |
| 4,855,115 | 8/1989 | Imanari et al. | 423/239 |
| 4,865,827 | 9/1989 | Tachi et al. | 423/239 |
| 4,977,127 | 12/1990 | Rikimaru et al. | 423/239 |
| 4,980,040 | 12/1990 | Lichtin et al. | 204/157.46 |

FOREIGN PATENT DOCUMENTS

| | | | |
|---|---|---|---|
| 789 | 1/1977 | Japan | 423/239 |
| 157347 | 7/1986 | Japan | 423/239 |
| 201647 | 9/1987 | Japan | 423/239 |
| 241554 | 10/1987 | Japan | 423/239 |
| 62548 | 3/1988 | Japan | 423/239 |
| 7400892 | 12/1974 | Netherlands | 423/239 |

OTHER PUBLICATIONS

M. Shelef et al., "The Heterogeneous Decomposition of Nitric Oxide on Supported Catalysts," *Atmospheric Environment*, Pergamon Press 1969, vol. 3, pp. 107–122.

Boer et al. *ChemTech*, May 1990, pp. 312–319.

Calvert, S. and H. M. Englund (eds) *Handbook of Air Pollution Technology*, J. Wiley & Sons, Inc., N.Y., 1984, pp. 71–81, 203–213, 489–512.

Harrison et al., "Catalysis of Reactions Involving the Reduction or Decomposition of Nitrogen Oxides", *Catalysis*, The Royal Society of Chemistry, London, 1982, 5:127–171.

Perry, R. A. and D. L. Siebers, *Nature* 324: 657–658, 1986.

Iwamoto et al., *J. Chem Soc. Commun.*, pp. 1272 and 1273, 1986.

Winter, E. R. S., *J. Catal.* 22: 158–170.

Winter, E. R. S., *J. Catal.* 34: 440–444.

Yur'eva et al., *Kinet. Catal.* 6: 941–944.

*Primary Examiner*—Wayne Langel
*Attorney, Agent, or Firm*—Nilsson, Wurst & Green

[57] ABSTRACT

The present invention provides a variety of thermal catalytic methods for the conversion of NO and other $NO_x$ compounds into environmentally compatible products such as molecular nitrogen, molecular oxygen, and carbon dioxide. The catalysts employed are able to remove NO in substantial percentage quantities over a wide temperature range of 0°–1,000° C. and a preferred temperature of 100°–800° C. both in the presence or in the absence of chemical reducing agents.

16 Claims, 2 Drawing Sheets

THERMAL CATALYTIC METHODS FOR CONVERTING OXIDES OF NITROGEN INTO ENVIRONMENTALLY COMPATIBLE PRODUCTS

CROSS-REFERENCE

The present invention is a Continuation-In-Part of United States patent application Ser. No. 371,172 filed Jun. 26, 1989, now U.S. Pat. No. 4,980,040.

FIELD OF THE INVENTION

The present invention is concerned with processes for the control of nitrogen-containing pollutants in the air; and is particularly directed to thermal catalytic conversion of oxides of nitrogen present within gaseous streams originating from exhaust gases produced by combustion of fossil fuels and ordinarily released into the environment at large.

BACKGROUND OF THE INVENTION

Within our highly technological and industrial world, the oxides of nitrogen have become recognized as major pollutants of the air and the environment. Perhaps the best known of these pollutants are nitric oxide (NO) and nitrogen dioxide ($NO_2$) which originate in the exhaust gases produced by the combustion of fossil fuels within internal combustion engines used in automobiles, diesel engines, jet engines used in propulsion of aircraft, gas-turbine power generators, steam power-plants and space-heating systems based on the burning of natural gas, petroleum products, and other fossil fuels. Nitric oxide in combination with hydrocarbon vapors leads to the formation of photochemical smogs including ozone, a health and ecological hazard. Similarly, nitrogen dioxide is a precursor of acid rain [Calvert, S. and H. M. Englund, Handbook Of Air Pollution Technology, John Wiley & Sons, Inc., N.Y., 1984, pp 71-81].

In theory, the decomposition of both NO and $NO_2$ into molecular oxygen and molecular nitrogen is thermodynamically spontaneous at 25° C. [$G° = -20.72$ and $-12.39$ kcal/mole for NO and $NO_2$ respectively]; but uncatalyzed gas-phase decomposition does not proceed at a significant rate at this temperature. Rather, the position of equilibrium among NO, $NO_2$, $N_2$, and $O_2$ shifts towards NO with increasing temperature above 1,000° C. Thus, NO is a reaction by-product of many high-temperature reactions generally; and is a specific by-product of the high-temperature combustion of natural gas and other carbonaceous fuels even when such fuels do not contain chemically bound nitrogen. Subsequently, the oxidation of a part of NO into $NO_2$ typically occurs when NO-containing exhaust gas from fuel combustion is mixed with air thereby producing a mixture of oxides of nitrogen commonly designated as $NO_x$, wherein x is a positive number.

It is noteworthy that in spite of extensive research, no practically effective catalyst or catalytic reaction for the decomposition of NO (and $NO_x$ generally) into molecular nitrogen ($N_2$) and oxygen ($O_2$) has been reported [Harrison et al., "Catalysis of Reactions Involving The Reduction Or Decomposition Of Nitrogen Oxides", in *Catalysis, Volume 5*, (G. C. Bond and G. W. Webb, editors) The Royal Society Of Chemistry, London, 1982, pages 127-171; Mobley, J. D. and K. J. Lim, "Control Of Gases By Chemical Reaction", and E. DeKiep and D. J. Patterson, "Emission Control In Internal Combustion Engines," in *Handbook Of Air Pollution Technology*, John Wiley and Sons, Inc., N.Y., 1984, pages 203-213 and 489-512, and the references cited therein]. Instead, present technology controls $NO_x$ in general by chemically reducing these pollutants to molecular nitrogen ($N_2$). This is accomplished in several ways: A non-catalytic thermal reduction of $NO_x$ by heating to a temperature between 2,000°-3,000° F. is effective [U.S. Pat. Nos. 4,405,587 and 4,811,555]. Also, control of emissions from stationary sources accomplishes $NO_x$ reduction using $NH_3$ as in the non-catalytic "$DeNO_x$" process developed by Exxon Corporation for treatment of stack gases [U.S. Pat. No. 3,900,554]. Similarly, one can employ the selective catalytic reduction or "SCR" processes using NH as a selective reducing agent and a catalyst such as $V_2O_5$ [Mobley and Lim, op. cit., pp 206-209; Boer et al., ChemTech, May, 1990 issue, pp 312-319]. The SCR process is termed "selective" because the $NH_3$ reducing agent preferentially chemically attacks $NO_x$ rather than $O_2$. In comparison, the removal of $NO_x$ from the exhaust gases stemming from internal combustion engines is accomplished by reducing the $NO_x$ to $N_2$ using CO and/or unburned hydrocarbons catalyzed by platinum and rhodium [DeKiep and Patterson, supra]. In addition, a recent report describes the use of cyanuric acid $(HOCN)_3$, to reduce NO into $N_2$ non-catalytically with concomitant production of carbon monoxide and release of unconsumed HOCN as a means of treating diesel exhaust [Perry, R. A. and D. L. Siebers, *Nature* 324:657-658 (1986)].

A variety of problems, however, exist among these known techniques: While large scale industrial processes use $NH_3$ to reduce oxides of nitrogen selectively, the use of $NH_3$ as a reactant involves an incomplete removal of $NO_x$ compounds; the major risk of substituting one hazardous pollutant ($NH_3$) for another ($NO_x$); and/or oxidizing $NH_3$ to $NO_x$ if conditions are not vigorously controlled. Similarly, the use of cyanuric acid merely substitutes CO and HNCO in place of a significant fraction of NO in the effluent gas and also requires periodic replenishment of that reagent [Dubois et al., *J. Catal.* 65:318 (1980); Unland, M. L., *J. Phy. Chem.* 77:1952 (1973)].

In comparison, our present knowledge regarding the behavior of metal oxide catalysts in $NO_x$ decomposition stems largely from the work of Winter on thermal catalytic decomposition of NO using metal oxides [E. R. S. Winter, *J. Catal.* 22:158-170 (1971); E. R. S. Winter, *J. Catal.* 34:440-444 (1974)]. His reported results identify a variety of metal oxides which display thermal catalytic activity over temperatures ranging from 330°-870° C. while acting on 50-400 Torr of NO in the absence of other gases. Rates were low—e.g., in the range of $6.5 \times 10^{-9}$ mole $M^{-2}S^{-1}$ or less to $4.1 \times 10^{-5}$ mole $M^{-2}S^{-1}$ at 500° C.—and catalytic poisoning by $O_2$ was observed in all instances. Similar observations of the very limited activity of thermal catalysis even under markedly reduced pressure conditions (100-300 mm Hg) at temperatures between 250°-700° C. were also reported by Yur'eva et al., [*Kinet. Catal.* 6:941 (1964)].

It will be appreciated that the concept, understanding, and importance of the oxygen desorption requirement in order that catalysis using metallic oxides occur originated with and was first presented by Winter in his 1971 publication. Clearly, the demand for oxygen desorption at the catalytic surface in order that a pure metal or metal oxide catalyst be able to decompose oxides of nitrogen actively and at least at moderate rates is presently believed to be the dominant requirement and foremost characteristic of $NO_x$ catalysis and removal. In brief, as the initial stepwise catalytic decomposition of NO (and other oxides of nitrogen) begins and $O_2$ is yielded, the effect of oxygen either in the introductory feed gas and/or generated as a reaction product poisons the catalyst and quickly decreases the kinetic activity of the catalyst. See for example, Amirnazmi et al., *J. Catal.* 30:55 (1973). The only reported metal oxide catalysts whose activity is said to be unaffected by $O_2$, albeit at low rates of activity, are the alkaline-earth oxides [Menbus, P., *J. Electrochem. Soc.* 124:49 (1977)]; cupric ion-exchanged Y-type zeolites [Wamoto et al., *J. Chem. Soc. Faraday Trans.* 77:1629 (1981)]; and ZSM-5 zeolites [Iwamoto et al., *J. Chem. Soc. Chem. Commun.* (? ):1272-1273 (1986)]. Each of these catalysts is reported not to be poisoned by $O_2$; but each also concomitantly yields $NO_2$ as a reaction by-product at temperatures above 400° C. where the catalyst is active in decomposing NO.

In addition and as an alternative to the "selective" nitrogen-containing reducing agents (which react with NO and other $NO_x$ compounds in preference to $O_2$), a variety of different "non-selective" compositions (which react with both $NO_x$ and $O_2$ but give harmless products with $O_2$) were purposefully included in the gaseous stream as co-reactants for $NO_x$ catalysis. Such non-selective catalytic reductants included carbon monoxide (CO), hydrocarbons of varying size and composition, and molecular hydrogen ($H_2$) [Bond, G. C. and G. Webb, *Catalysis*, Volume 5, Royal Society Of Chemistry, 1982, pp 147-161]. Non-selective co-reactants as CO, acting as a chemical reducing agent in combination with metal oxides such as $Al_2O_3$ at temperatures ranging from 650°-950° C., reacted with the oxygen released by the NO and generated at the catalyst surface to yield $CO_2$ as a final reaction product in addition to the catalytic formation of $N_2$ [Mori, Y. and K. Ohtake, Combust. Sci. Technol. 16:11 (1977)].

Overall, therefore, there remains a clear and generally recognized need for new catalytic processes and a novel catalytic technology which are able to decompose NO and oxides of nitrogen generally into environmentally compatible products using catalysts which do not suffer from the inadequacies, drawbacks, and hazards of conventionally known techniques and industrial processes which employ nitrogen-containing or other chemical reducing agents. The development of such a thermal catalytic method for converting and removing substantial quantities of nitric oxide and other oxides of nitrogen would therefore be recognized as a major improvement and long sought for advance in controlling pollutants originating by the combustion of fossil fuels.

SUMMARY OF THE INVENTION

The present invention provides a thermal catalytic method for decomposing oxides of nitrogen into environmentally compatible products, said method comprising the steps of:

obtaining at least one solid catalyst comprising not less than two materials selected from the group consisting of noble metals, transition metal oxides, and rare-earth metal oxides;

introducing a gaseous stream comprising at least one oxide of nitrogen to said solid catalyst in the presence or absence of a reducing agent to form a reaction mixture;

maintaining said reaction mixture at ambient pressure and at a temperature less than about 1,000° C.; and allowing said solid catalyst of said maintained reaction mixture to catalytically decompose substantial quantities of said oxides of nitrogen into environmentally compatible products.

DETAILED DESCRIPTION OF THE FIGURES

Figure 1:
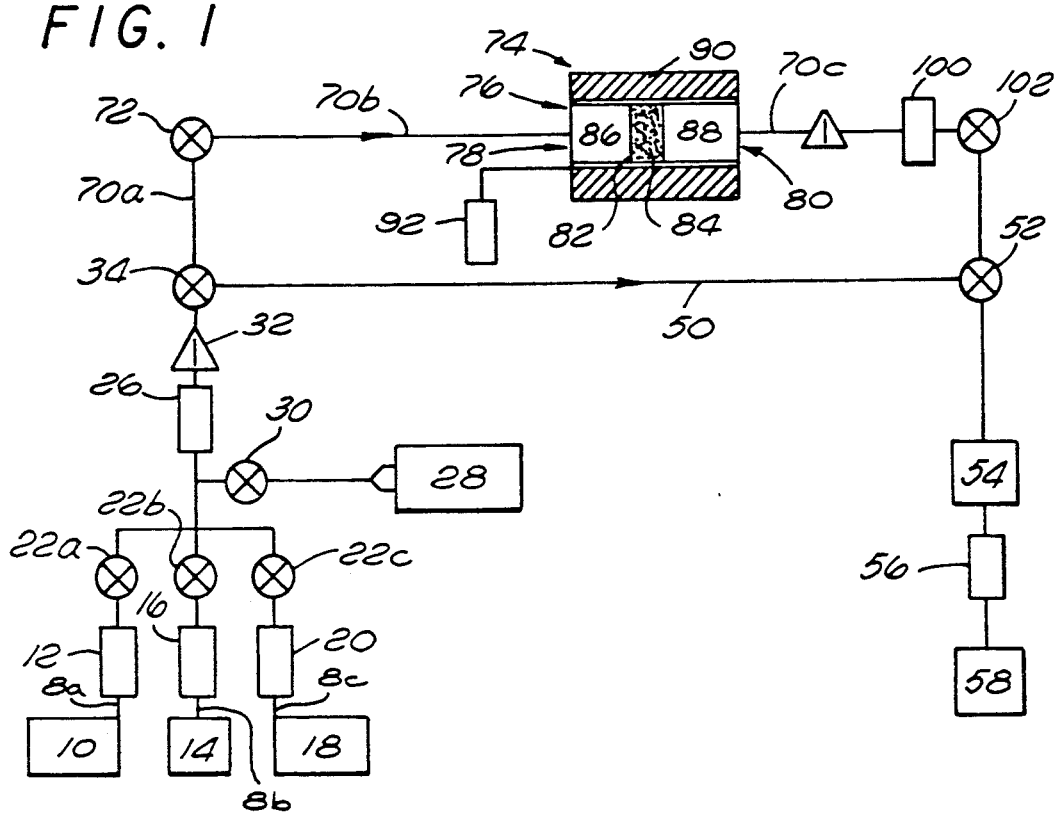
Figure 2:
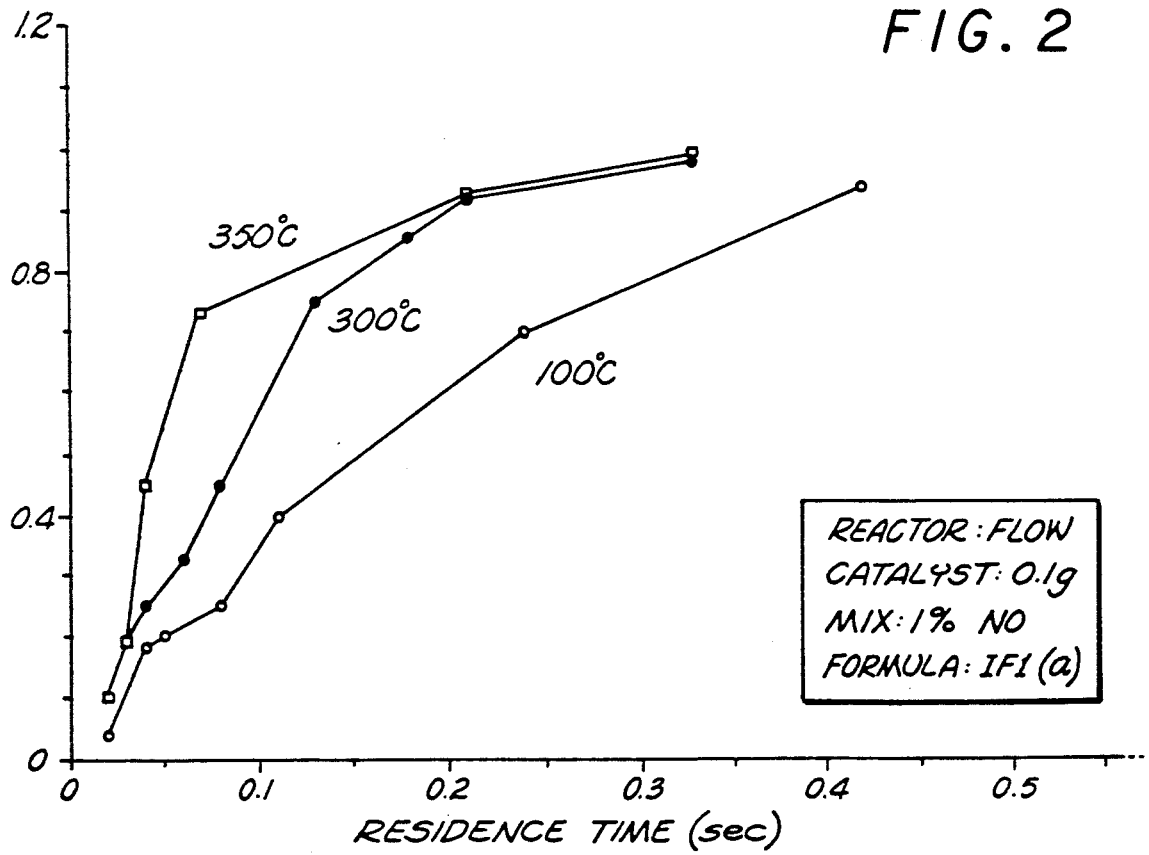
Figure 3:
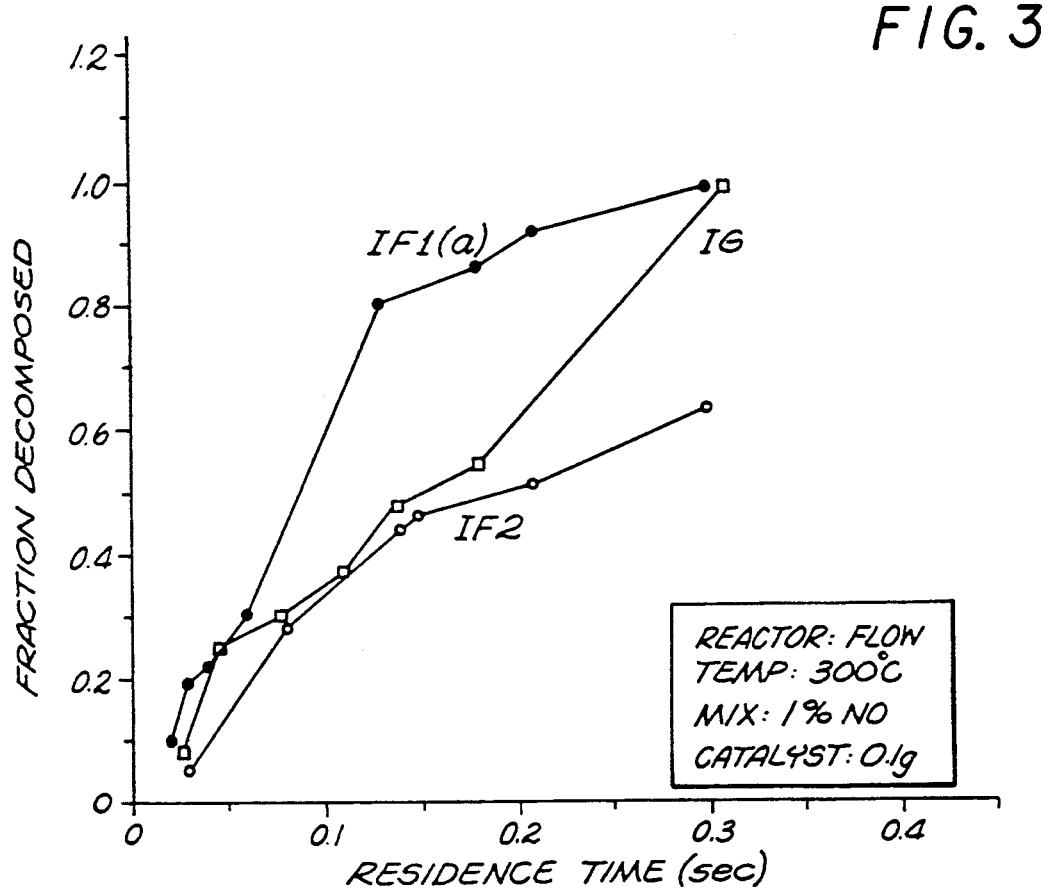
Figure 4:
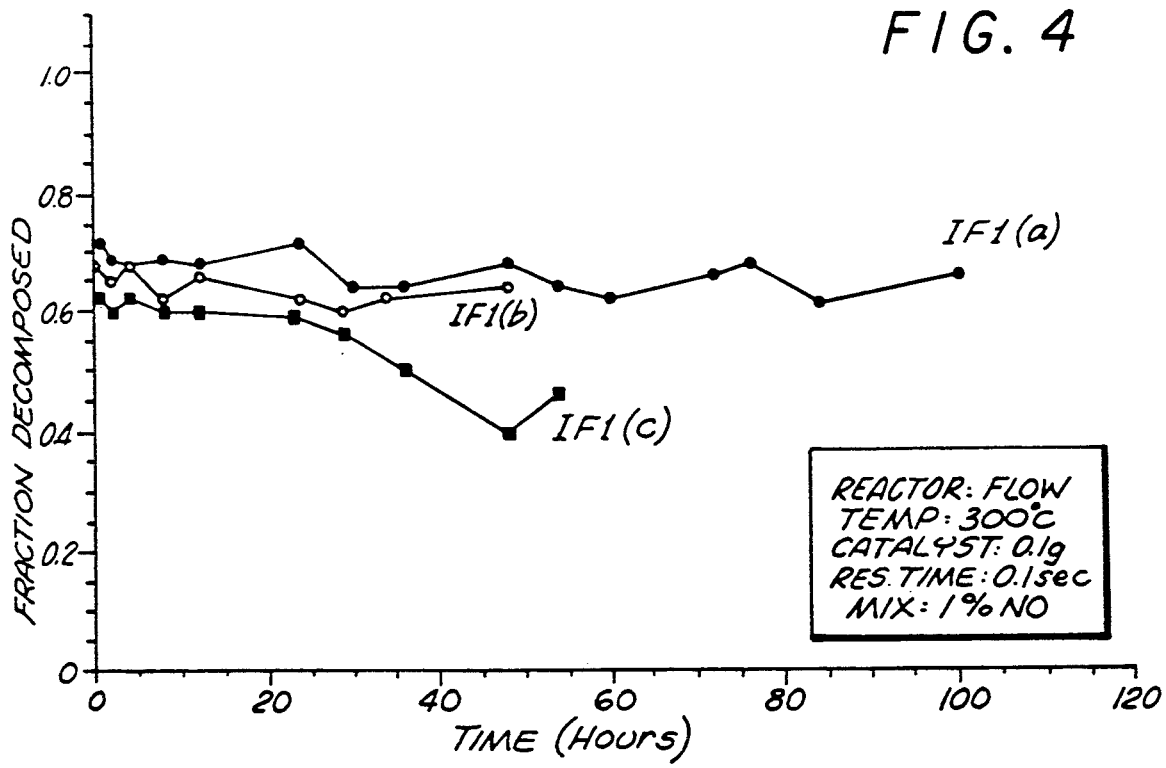

The present invention may be more clearly and easily understood when taken in conjunction with the accompanying drawing, in which:

FIG. 1 is a flow diagram of a continuous flow reaction apparatus useful in practicing the present invention; and FIG. 2 is a graph illustrating the fractional decomposition of NO at 100°-350° C. as a function of residence time using formulation No. IF1 [Pt/La-Ni-oxide] as the catalyst;

FIG. 3 is a graph illustrating the fractional decomposition of NO at 300° C. as a function of residence time using the formulation Nos. IF1 and IF2 [Pt/La-Ni-oxide] and IG [Pt/La-Cu-oxide] individually as catalysts; and FIG. 4 is a graph illustrating the fractional decomposition of NO at 300° C. as a function of time using formulation Nos. IF1, IF2, and IF3 [Pt/La-Ni-oxide] individually as catalysts.

DETAILED DESCRIPTION OF THE PREFERRED EMBODIMENTS

The present invention is a catalytic method for the conversion (or decomposition) of oxides of nitrogen generally—that is, $NO_x$ compounds wherein x is a positive number, all of which are recognized as major pollutants of air and the ambient environment generally. The unique methodology may be performed under alternative conditions; and relies primarily upon the thermal activated, solid-catalyzed degradation of nitric oxide (NO), present in a gaseous stream. Nitric oxide and other $NO_x$ compounds typically originate in the exhaust gases produced by such sources as industrial smoke stacks, automobile engines, jet engines, gas-turbine power generators, and the combustion of fossil fuels generally. Using this novel process, such NO as is present is decomposed into $N_2$ and $O_2$ by passage over a specifically formulated solid catalyst at temperatures substantially between 0°-1,000° C., and preferably between 100°-800° C. Alternative formats employ various catalytic formulations with carbon monoxide and/or other CH-containing compounds—either as a conditioning agent or as a co-reactant; and catalytically yield $N_2$ and either $O_2$ and/or $CO_2$ as final reaction products.

The present thermal catalytic processes thus provide a number of major benefits and advantages to the user which were previously unavailable and unforeseen. These include the following:

1. The present method is intended to be employed at ambient environmental pressures, typically 0.8-1.3 atmospheres. There is thus no need for pressure chambers and for in-line compressors or vacuum generating equipment to be employed n order that catalytic decomposition of $NO_x$ compounds occur in substantial quantities.

2. The present method is intended to be used either at ambient environmental temperatures or at elevated temperatures up to about 1,000° C. As demonstrated empirically hereinafter, meaningful quantities of NO are catalytically decomposed at 25° C. The addition of heat merely increases the catalytic rate and promotes the total percentage quantity of $NO_x$ compounds converted. The optimal temperature range for $NO_x$ decomposition typically lies between 100°-800° C. Clearly, however, the ability to decompose substantial amounts of NO (and $NO_x$ compounds generally) at temperatures less than about 200° C. using solid metal oxide catalysts was previously unobserved and unreported. The present methods thus provide capabilities and applications which are completely unforeseen and unexpected in this art.

3. The catalytic process described herein also reveals other unique properties of the metal oxide catalysts when carbon monoxide is employed as a preconditioning treament for the materials comprising the catalyst prior to reaction or as a co-reactant for catalysis in combination with NO and other $NO_x$ compounds. As a result of carbon monoxide conditioning treatment prior to actual use, the materials comprising the catalyst formulations become unusually active and then provide very high yields of $NO_x$ decomposition, typically decomposing more than 35% and often greater than 80% quantitatively of the NO concentration initially present. Alternatively, when carbon monoxide is employed as a co-reactant in the introductory gaseous stream, NO and other $NO_x$ compounds are catalytically degraded into $N_2$, $O_2$, and $CO_2$ in substantial quantitative yields far greater than 35% and often greater than 90% decomposition.

4. The catalytic method of the present invention also allows for the purposeful inclusion of hydrocarbons and other CH-containing compounds as both conditioning agents for the catalyst and as co-reactants in the catalytic conversion of $NO_x$ compounds generally. The hydrocarbons and other CH-containing compounds are in a gaseous state and comprise those carbon-containing compositions released by the combustion of coal and petrolium based fuels (coke, coal tar, gasoline, diesel fuel, heating fuel, etc.). Representative of these gaseous hydrocarbon co-reactants are methane, ethane, octane, decane; hydrocarbon oils such as benzene, toluene, cresols, xylene, and higher homologues; and both saturated and unsaturated hydrocarbons and other heteratom-containing organic compounds comprising from 1-12 carbon atoms. When such gaseous hydrocarbons are present as co-reactants in the eluent gaseous stream, NO and other $NO_x$ compounds are catalytically converted into $N_2$, $O_2$, and $CO_2$ in quantitative yields greater than 35% decomposition.

5. The catalytic process of the present invention are effective over very short reaction times (or high space velocities) and thus require very small residence times in a reaction chamber for catalysis to be complete. Residence times typically range from 0.025-0.25 seconds (space velocities of from 15,000-150,000 $hr^{-1}$) for substantial quantities of NO (typically 35% or greater) to be yielded. In operational terms, the user thus can catalytically degrade and remove $NO_x$ compounds as fast as they can be fed into a prepared reaction chamber via a gaseous stream feed.

In order to properly recognize and appreciate the unique merits and unusual benefits provided by the present catalytic method, detailed disclosures and in-depth descriptions of the $NO_x$ reactants, the reaction apparatus and gaseous reaction mixtures, and the various classes of catalysts are presented. Subsequently, a variety of experiments and empirical data are adduced to demonstrate and factually evidence the capabilities and uses of the invention. By this mode of presentation, persons ordinarily skilled in the art will recognize the broad range of uses and applications for which these unique methods can be advantageously employed.

$NO_x$ REACTANTS

Clearly, the catalytic process of the present invention rely and depend upon the presence of nitric oxide in a gaseous stream as the requisite raw material in order that the catalytic decomposition proceed. The present invention, however, is not limited merely to the decomposition of nitric oxide (NO) alone. To the contrary, the present methodology is useful with gaseous streams containing $NO_2$, $NO_3$, $N_2O$, $N_2O_3$, and $N_2O_4$ as well as with gases containing other $NO_x$ compounds (wherein x is a positive number) uniformly. Various oxides of nitrogen are typically decomposed under a variety of different conditions and circumstance into nitric oxide and other products. Accordingly, recognizing that the present process may be conducted at ambient as well as at temperatures ranging substantially between 0°-1,000° C.; and recognizing further that the gaseous stream containing one or more oxides of nitrogen of varying composition and structure will, in the main, degrade under these circumstances into nitric oxide (NO) or directly into $N_2$ and $O_2$, it is clearly evident that the present invention will accomplish the catalytic conversion of all the different oxides of nitrogen categorically. In this manner, the present invention is deemed suitable for the decomposition of all oxides of nitrogen generally as well as for the catalytic decomposition of $NO_x$ and NO specifically.

REACTOR APPARATUS AND REACTION MIXTURES

The conversion methodology comprising the present invention may be performed using any appropriate, tangible apparatus or discrete housing able to provide a controlled gaseous stream. For research purposes, the reaction chamber can take any physical form such as a stainless-steel, continuous flow tube fitted with a heater and with temperature control and measuring devices. Alternatively, specially designed reaction units designed for retrofit into existing systems for the combustion of fossil fuels (including exhaust stacks, auto engines, jet engines, and gas turbines) operating at elevated temperatures would also serve as the appropriate apparatus. Such specially designed reaction chamber units would be in flow communication with the exit gases from fossil fuel combustion which as a gaseous stream would then be introduced to a prechosen solid catalyst placed within the reaction chamber. It is expected that conventionally known piping, tubing, valves, or other conduit means would be used to convey the $NO_x$ containing gaseous stream to the immediate vicinity of the catalyst within the reactor chamber unit. Moreover, the prepared gaseous mixture introduced for catalysis need not be pure in content; under normal use conditions, it is expected that a variety of other gases and vapors such as water vapor, dinitrogen, methane, carbon monoxide, carbon dioxide, oxygen, and unburned or partially oxidized hydrocarbons and/or other CH-containing compounds may be present. None of these incidental compositions or additives will prevent the catalytic conversion of $NO_x$ compounds; and the presence of carbon monoxide and/or hydrocarbons will enhance the catalysis.

As noted above, the present method demands only that at least one oxide of nitrogen, preferably NO, be combined with at least one solid catalyst (of defined formulation) at ambient environment pressure; and that this reaction mixture be kept either at ambient temperature or be elevated to a temperature less than about 1,000° C., and preferably between 100°-800° C. Moreover, the catalytic reaction can be optionally performed in the absence or presence of a reducing agent, including either nitrogen-containing and/or carbon-containing reducing agents. The conversion reaction may therefore be conducted continuously over 24 hour periods, intermittently, or over any desired time interval deemed suitable for use for the intended application.

It will thus be recognized that the essential requirement for the methodology is: when the chosen solid catalyst and the introductory gaseous stream containing one or more oxides of nitrogen are combined at ambient pressure as a reaction mixture and kept at ambient temperature or heated to an appropriate elevated temperature, that the solid catalyst then exist and remain in an activated catalytic state; and that this activated catalytic state directly cause the conversion of $NO_x$ compounds rapidly and in substantial percentage quantities into molecules of nitrogen and into other environmentally compatible products such as oxygen ($O_2$) and carbon dioxide ($CO_2$).

The particular reaction parameters are thus variable and accordingly include: the allowed time for catalytic reaction; the precise ambient temperature or elevated temperature employed; the amount, discrete physical state, and precise chemical composition of solid catalyst employed; the physical deployment of the catalyst within the reaction chamber; the nature and amounts of incidental substances present in the introductory gaseous stream; and the flow rate of and residence time for the introductory gaseous stream comprising at least one oxide of nitrogen. Some of the preferred parameters and reaction conditions are those which have been empirically observed—as will be described in detail hereinafter. Nevertheless, many different operative and useful catalytic conversion reactions may be obtained using a diverse range and wide disparity of factors. All of these reaction variables are deemed to be matters of personal choice and may be selected to meet the user's individual requirements or convenience.

CATALYST FORMULATIONS

The solid catalysts forming the broad class of prepared formulations comprises not less than two materials, and often three materials, selected from the group consisting of noble metals, transition metal oxides, and rare-earth metal oxides. Representative examples of these different materials individually are provided below by Tables 1, 2, and 3, respectively. In addition, the catalyst formulations may optionally include an alkaline-earth oxide; or a Group III metal oxide; or a Group IV B metal oxide. The Group III metal oxides are listed within Table 4 below. Similarly, the alkaline earth oxides are listed within Table 5; and the Group IV B metal oxides by Table 6.

TABLE 1

| Noble (Platinum Series) Metals | Symbol |
|---|---|
| Platinum | Pt |
| Palladium | Pd |
| Iridium | Ir |
| Rhodium | Rh |

TABLE 1-continued

| Noble (Platinum Series) Metals | Symbol |
|---|---|
| Osmium | Os |
| Ruthenium | Ru |

TABLE 2

| Transition Metal (First Series) Oxides | Symbol |
|---|---|
| Titanium Oxides | $TiO_2$; $Ti_2O_3$ |
| Vanadium Oxides | $V_2O_5$—$VO_{1.35}$ |
| Chromium Oxides | $Cr_2O_3$; $CrO_2$; $CrO_3$ |
| Manganese Oxides | $MnO_2$; $Mn_2O_3$ |
| Iron Oxides | $FeO$; $Fe_2O_3$; $Fe_3O_4$ |
| Cobalt Oxides | $CO_3O_4$; $Co_2O_3$; $CoO$ |
| Nickel Oxides | $NiO$, $Ni_2O_3$ |
| Copper Oxides | $Cu_2O$; $CuO$ |

TABLE 3

| Rare-Earth Metal Oxides | Symbol |
|---|---|
| Lanthanum oxide | $La_2O_3$ |
| Cerium oxide | $CeO_2$ |
| Praseodymium oxide | $Pr_6O_{11}$, $Pr_2O_3$, $PrO_2$ |
| Neodymium oxide | $Nd_2O_3$ |
| Samarium oxide | $Sm_2O_3$ |
| Europium oxide | $Eu_2O_3$ |
| Gadolinium oxide | $Gd_2O_3$ |
| Terbium oxide | $Tb_2O_3$, $Tb_4O_7$, $TbO_2$ |
| Dysprosium oxide | $Dy_2O_3$ |
| Holmium oxide | $Ho_2O_3$ |
| Erbium oxide | $Er_2O_3$ |
| Thulium oxide | $Tm_2O_3$ |
| Ytterbium oxide | $Tb_2O_3$ |
| Lutetium oxide | $Lu_2O_3$ |

TABLE 4

| Group III Metal Oxides | Formulation(s) |
|---|---|
| Aluminum Oxides | $Al_2O_3$ (alpha and gamma) |
| Gallium Oxides | $Ga_2O_3$ (alpha and gamma) |
| Indium Oxide | $In_2O_3$ |
| Thallium Oxide | $Tl_2O_3$ |

TABLE 5

| Alkaline-Earth Oxides | Formulation |
|---|---|
| Magnesium oxide | MgO |
| Calcium oxide | CaO |
| Strontium oxide | SrO |
| Barium oxide | BaO |

TABLE 6

| Group IV B Metal Oxides | Formulation |
|---|---|
| Scandium oxide | $Sc_2O_3$ |
| Yttrium oxide | $Y_2O_3$ |

The catalytic formulations used in the present invention are solids preferably used in powdered or subdivided form in order to expose a large surface area for reaction. In addition, the methods of preparing such catalytic formulations are well known and conventionally described in the scientific and industrial literature; and the reader is presumed to have both knowledge and familiarity with the properties and characteristics of noble metals, transition metal oxides, and rare-earth metal oxides, as well as the various techniques for combining them into solid preparations ready for use. Some descriptive details are provided by F. A. Cotton and G. Wilkinson's *Advanced Inorganic Chemistry*, 4th edition, John Wiley & Sons, N.Y., 1980—the text of which is expressly incorporated by reference herein.

PREFERRED CATALYST FORMULATIONS

Within the broadly defined class of formulations comprising the thermal catalysts of the present invention, it will be recognized and appreciated that some catalyst formulations are more suitable for use and optimize a given set of reaction conditions in comparison with other members of the catalytic class. The present catalytic conversion method has been evaluated and empirically revealed the presence of at least three different modes of catalytic reaction—each of which employs alternative catalytic formulations for achieving best results. For purposes of identifying the optimal and preferred catalyst formulation desirably employed within each mode of reaction individually, the broad catalytic class has been arbitrarily and optionally divided into three preferred subclasses, designated as subclasses I, II, and III respectively.

Optional Subclass I Catalyst Formulations: These include all the formulations within the broad catalytic class which comprise a noble metal and at least one material selected from the group consisting of a transition metal oxide and a rare-earth metal oxide. The preferred transition metal oxides include $TiO_2$ (anatase form); NiO; CoO; CuO; $Fe_2O_3$; and $Mn_2O_3$. Similarly, the preferred rare-earth metal oxide is lanthanum oxide. Accordingly, the most desired formulations of Class I catalysts are Pt/Ti-Oxide; Pt/La-Ni-Oxide; and Pt/La-Cu-Oxide.

When a subclass I catalyst is employed, the thermal catalytic decomposition proceeds in substantial quantitative yields (usually 35% or more); at ambient environmental pressures and at temperatures less than about 1,000° C.; and in the presence or absence of a reducing agent, in accordance with Reaction I below.

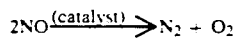  [Reaction I]

Note that for purposes of Reaction I, the presence of other compositions in the gaseous stream include small amounts of CO, $CO_2$, $H_2$, hydrocarbons, and other CH-containing compounds, water vapor, and the like as well as a carrier gas such as molecular nitrogen or helium does not diminish or hinder either the rate of reaction or the quantitative percentage (typically 35% or more) of NO actually decomposed. In this respect also, the accidental or intended presence or complete absence of a nitrogen-containing "selective" reducing agent such as ammonia or cyanuric acid is expected not to alter the essence of Reaction I or the substantial quantitative decomposition of NO and other $NO_x$ compounds. Similarly, the presence or absence of a "non-selective" reducing agent such as carbon monoxide or molecular hydrogen will not meaningfully affect the catalytic reaction.

Optional Subclass II Catalyst Formulations: These catalyst formulations are preconditioned by exposure to gaseous carbon monoxide or a CH-containing compound for a predetermined time period prior to use for catalytically decomposing $NO_x$ compounds. The conditioning procedure pretreats the catalyst formulation with a preferred gaseous mixture of 30% CO and 70% $N_2$ for about 30 minutes duration. In general, any carbon monoxide concentration will also serve for conditioning purposes, but it is expected that the smaller the CO concentration, the longer the time required for catalyst conditioning to be complete. Moreover, the conditioning of the subclass II formulations may be performed at the time of first preparing the catalyst formulation; or can occur immediately prior to using the catalyst preparation after its deposition within the reaction chamber.

The subclass II catalysts are formulations which comprise a transition metal oxide and at least one other material selected from the group consisting of transition metal oxides and rare-earth metal oxides. The most preferred formulations are La-Ni-oxide and Cu-Ni-Ti-oxide. Each of these formulations are conditioned by exposure to carbon monoxide prior to use.

The decomposition of $NO_x$ compounds using these conditioned subclass II catalysts proceeds in substantial quantitative yields (typically 35% and greater) at ambient environmental pressures and at temperatures ranging from about 0°–1,000° C. in acccordance with Reaction II below.

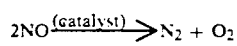  [Reaction II]

Here also, the presence of incidental compositions in the gaseous stream carrying the NO and/or $NO_x$ compounds is deemed not to meaningfully affect Reaction II. Thus, small quantities of CO, $CO_2$, $H_2$, and hydrocarbons as well as nitrogen-containing reducing agents such as ammonia may optionally be present as well in the gaseous stream provided by a carrier gas without altering or changing the catalytic reaction.

Optional Subclass III Catalyst Formulations: The formulations of the Subclass III catalysts are not pretreated prior to use; but instead become catalytically more active via the presence of carbon monoxide or a CH-containing compound as a catalytic co-reactant in the introductory gaseous stream. This, in turn, causes substantial decomposition of NO (typically 35% and greater percentage yields) to occur. The proportional ratios of carbon monoxide or a CH-containing compound to NO (or $NO_x$ compound) in the gaseous stream may be widely varied and include ratios of 1:1 (volume to volume) and 30:1. For example, as empirically demonstrated hereinafter, substantial quantities of NO (typically 35% and greater) are catalytically converted when 2.8% NO and 0.7% CO are introduced via a nitrogen carrier gas to a subclass III catalyst. Similarly, when 1% NO and 30% CO are combined in 69% $N_2$, the quantitative conversion of NO by some catalytic formulations approaches 100%.

The subclass III catalysts comprise formulations which can best be defined in the alternative. Some formulations comprise a transition metal oxide and at least one other material selected from the group consisting of noble metals, transition metal oxides, and rare-earth metal oxides. Alternatively, other formulations comprise two different transition metal oxides and at least one other material selected from the group consisting of Group II element oxides, Group III metal oxides, and rare-earth metal oxides. Optionally present are alkaline-earth oxides or Group IV B oxides. Preferred examples of subclass III catalysts are: Cu-Ni-Al-oxide; Cu-Ni-Ti-oxide; Pt/Fe-oxide; Pt/La-Ni-oxide; and La-Ni-oxide.

The rapid conversion by subclass III catalysts of NO and other $NO_x$ compounds in combination with CO as a catalytic coreactant proceeds at ambient environmental pressures and at temperatures ranging from about 0°–1,000° C. in accordance with Reaction IIIA and IIIB below.

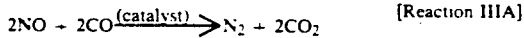
[Reaction IIIA]

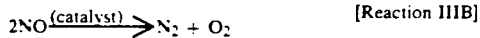
[Reaction IIIB]

EXPERIMENTAL DESIGN AND EMPIRICAL DATA

To further describe the subject matter as a whole comprising the thermal catalytic process of the present invention, a variety of different reaction parameters and influential factors, using catalysts of subclasses I, II, and III within different experiments performed in the laboratory will be described. These parameters, factors, catalyst formulations, and laboratory scale experiments will serve to merely illustrate the diversity of applications, formats, and conditions under which $NO_x$ in a gaseous stream can be catalytically degraded and removed by the present process. While the equipment, experimental design, and empirical data are solely in laboratory scale terms, it is clear that the described reactions can be expanded at will to meet the diversity and the scale of industrial apparatus and commercial operations. In addition, it will be expressly understood that while a limited number of different materials and catalysts are employed to remove NO from a gaseous stream—often including water vapor, a carrier gas, and optionally carbon monoxide and/or CH-containing compounds—these empirical details do not either restrict or limit the present invention in any way. To the contrary, the described empirical experiments are merely representative of the variety and diversity of reactive conditions which can be advantageously employed using the present thermally promoted catalytic process.

REACTION APPARATUS

A continuous flow reaction apparatus was employed experimentally which is illustrated in schematic block form by FIG. 1. As seen therein, FIG. 1 is a flow diagram of the fixed bed continuous flow microreactor apparatus employed for the experiments described hereinafter. As shown, a series of compressed gas tanks 10, 14, and 18 were employed in preparing a controlled introductory gaseous stream for reaction. Tank 10 contained nitric oxide (NO) and molecular nitrogen ($N_2$) as the gas mixture. Tank 14 contained compressed helium (He). Tank 18 contained a mixture of compressed carbon dioxide ($CO_2$) and carbon monoxide (CO). Each tank of compressed gas was individually connected by piping 8a, 8b, and 8c to a series of precision stainless steel mass flow controllers 12, 16, and 20 which individually introduced the feed gases via valves 22a, 22b, and 22c into a single channel tube 24 in flow communication with a gas mixer 26. A source of water vapor 28 joined via valve 30 to the single channel tube 24 allowed for a controlled introduction of water vapor into the gaseous mixture. The desired combination of individual feed gases was mixed into an introductory gaseous stream by the gas mixer 26.

The introductory gaseous stream was then released through a line filter 32 and a valve 34 into a dual first and second flow pathway system. The first flow pathway directs the introductory gaseous stream via piping 50 and valve 52 to a gas chromatograph 54 which is in flow communication with a data interface 56 and a computer/data station 58. This first pathway is analytical in purpose and function; and provided the means by which to verify the true chemical composition of any gaseous stream in the system.

The second flow pathway extends via stainless steel piping 70a from valve 34 to valve 72 which, in turn, is in flow communication via stainless steel piping 70b with the fixed bed microreactor 74. The fixed bed microreactor 74 was a stainless steel tube 76, ½ inch wide (inner diameter) by 12 inches long, whose tubular ends 78 and 80 were fixed in position by stainless steel piping 70b and 70c. The middle spatial volume of the tube 76 served to hold the catalyst bed 82 in which the catalyst 84 was itself supported upon a bed of pyrex glass wool. The tube ends 78 and 80 were spatially filled by packings 86 and 88 composed of pyrex glass chips. The glass chip packing 86 served as a preheating and mixing zone for the gaseous reactants immediately before coming into reactive contact with the catalyst 84. The glass chip packing 88 served as post-reaction zone for mixing of the final reaction products resulting from catalysis within the microreactor 74.

The tubular microreactor 74 was itself housed within a furnace 90 which allowed the catalytic reaction temperature to be measured via a thermocouple/meter 92. When an elevated temperature above ambient room temperature (about 20° C.) was required as part of the reaction conditions, the external furnace 90 was engaged and the internal temperature of the tubular microreactor 74 heated using a proportional temperature controller (Omega, Model CN 5000) or a voltage regulator (not shown). The temperature of the catalyst bed 82 was measured by placing a chromel-constantan thermocouple 92 and a digital thermometer near the catalyst bed.

After catalytic reaction within the microreactor 74, the reaction products were discharged as an effluent gaseous stream via piping 70c to a gas flow meter 100 which, in turn, conveyed the gaseous stream of reaction products in metered amounts to valve 102. Then by piping 70d, the effluent gaseous stream was conveyed from valve 102 to valve 52 for analysis via the first flow pathway.

EXPERIMENTAL PROCEDURE

Studies on the catalytic conversion of NO were performed by passing specifically prepared mixtures of individual feed gases as an introductory gaseous stream through the catalyst bed of the tubular microreactor of FIG. 1 which was maintained at a single reaction temperature for the duration of the experiment. The range of reaction temperatures explored varied between 25°–550° C. (±0.2° C.). Procedurally, 0.2 grams of powdered catalyst formulation (passed previously through a 200 mesh screen) was placed on the pyrex glass wool support and positioned as a fixed bed in the middle of the tubular microreactor. Glass chip packings were then placed at the tubular ends; and the interior of the microreactor purged with flowing He gas (15–30 ml/min.) at 500° C. for about 12 hours time. The catalyst was then cooled in flowing He gas to the desired reaction temperature for the experiment before allowing the prepared gaseous reaction mixture to become exposed to the catalyst.

For many experiments, 1.0% NO in $N_2$ was the reaction mixture fed into the microreactor as the introductory gaseous stream. Similarly, CO, $CO_2$, and air were added in known volumetric quantities to the prepared 1.0% NO in $N_2$ mixture whenever required for the experiment. $H_2O$ in the form of water vapor was optionally added by bubbling either $CO_2$ or air through liquid water held at 25° C. Air also served as an $NO_x$ generator in these experiments. The flow rates for the prepared mixtures of feed gases supplied to form the introductory gaseous stream varied between 2-20 ml/min.

In addition, sets of experiments were performed in which various proportional amounts of 3.5% NO in $N_2$ and 3.5% CO in $CO_2$ were combined. The NO/CO ratio was varied between 1-5 while keeping the introductory flow rate at 10 ml/min. He gas was added as a diluent at any fixed NO/CO ratio as needed while varying the introductory flow rate between 10-200 ml/min.

Another set of empirical reactions were carried out by adding 10% $CH_4$ to 3.5% NO in $N_2$ using a flow rate of 10 ml/min. He gas was again used as a diluent as required. Water vapor was added by bubbling either 3.5% CO in $CO_2$ or $CH_4$ through $H_2O$ at 25° C.

Once prepared, the gaseous stream was introduced into the microreactor and the reaction allowed to proceed for 30 minutes duration in order to attain a steady state before any empirical measurements or analyses were made. The same procedural steps were followed in each instance whenever a change in reaction temperature or catalyst formulation was done in order to avoid error. After each experiment, the catalyst bed was purged with He gas at 500° C. overnight to insure purity of reaction conditions.

EXPERIMENTAL SERIES I

Subclass I Catalysts

A series of experiments were undertaken to empirically evaluate a variety of differently formulated catalysts and differently prepared mixtures of the same catalytic formulation under reactive conditions where no reducing agent of any kind was present in the introductory gaseous stream. Two different parameters were measured: the quantitative amount of NO actually decomposed with respect to the original amount present in the gas stream; and the relative activity of the catalyst formulation under test.

Preparation Of Catalysts

A variety of different materials including noble metals, transition metal oxides, rare-earth metal oxides, and Group III metal oxides were employed in alternative formulations and in the same formulation mixtures prepared differently. The formulations and modes of preparation are given by Table E1 below.

TABLE E1

| Catalyst Formula Number | Procedural Steps Of Preparation |
|---|---|
| 1A1 | Pt/Ti-oxide: 1% Pt deposited on $TiO_2$ (Degussa, P25) by impregnation with aqueous hexachloroplatinate (Johnson Matthey), dried at 100° C., reduced with $H_2$ at 350° C. for 30 minutes, and stabilized with air. Level of preparation: 10 g. |
| 1A2 | Pt/Ti-oxide: 0.5% Pt deposited on $TiO_2$ following method for catalyst formula 1A(1). |
| 1A3 | Pt/Ti-oxide: 0.1% Pt deposited on $TiO_2$ following method for catalyst formula 1A(1). |
| 1A4 | Pt/Ti-oxide: 0.01% Pt deposited on $TiO_2$ following method for catalyst formula 1A(1). |

TABLE E1-continued

| Catalyst Formula Number | Procedural Steps Of Preparation |
|---|---|
| IB | Pt/Fe-oxide: 1% Pt deposited on $\alpha$-$Fe_2O_3$ (Baker Analyzed) from Pt Sol in sodium citrate and heat treated in Ar for 1 hour at 300° C. Level of preparation: 10 g. |
| IC | Cu—Ni—Al-oxide: 1% NiO-10%CuO-89%$\gamma Al_2O_3$; $Ni^{2+}$ Baker Analyzed) and $Cu^{2+}$ (Fisher) nitrates impregnated on $\gamma$-alumina (Alfa), decomposed by heating in a muffle furnace, and heated at 500° C. for 6 hours. Level of preparation: 20 g. |
| ID1 | Cu—Ni—Ti-oxide: 1% NiO-10%CuO-0.89%$TiO_2$: Nitrates of $Cu^{2+}$ (Fisher) and $Ni^{2+}$ (Baker Analyzed) impregnated on $TiO_2$ (P25 Degussa), decomposed by heating in a muffle furance, and heated at 500° C. for 6 hours. Level of preparation: 20 g. |
| ID2 | Cu—Ni—Ti-oxide: Cu—Ni—$TiO_2$ [ID1] heated at 1,000° C. for 24 hours. |
| ID3 | Cu—Ni—Ti-oxide: Cu—Ni—$TiO_2$ [ID1] (0.2 g) mixed with 10% CaO and heat treated at 400° C. in flowing Ar for 24 hours inside the microreactor. |
| IE1 | La—Ni-oxide: Nickel (+2) oxalate was precipitated on $La_2O_3$ (Alfa) slurried in oxalic acid (Alfa) and $H_2O$ by the addition of nickel (+2) nitrate (Baker Analyzed) (La:Ni mole ratio of 1:1) and then heating the precipitate at 500° C. for 2 hours in $O_2$. Level of preparation: 10 g. |
| IE2 | La—Ni-oxide: Prepared by the decompositon of nitrates of La(+3) (Johnson Matthey) and Ni(+2) (Baker Analyzed) (La:Ni molar ratio of 1:1) and heated at 800° C. in $O_2$ for 24 hours. Level of preparation: 10 g. |
| IE3 | La—Ni-oxide prepared by decomposing nitrates of La(+3) (Johnson Matthey) and Ni(+2) (Baker Analysed) with a La:Ni molar ratio of 2:1 and which was heated at 1,000° C. for 24 hours. |
| IF1(a) | Pt/La—Ni-oxide: 0.4% Pt was deposited by the impregnation of hexachloroplatinate on La—Ni-oxide (IE2) and reduced with $H_2$ at 250° C. for 30 minutes. The catalyst was then stabilized with air. Level of preparation: 6 grams. |
| IF1(b) | Repeat preparation of IF1(a). |
| IF1(c) | Repeat preparation of IF1(a). |
| IF2 | Pt/La—Ni-oxide: 0.4% Pt was deposited using procedure described for Pt/La—Ni-oxide [IF1(a)] on La—Ni-oxide (IE3). |
| IG | Pt/La—Cu-oxide: 0.4% Pt was deposited using procedure described for Pt/La—Ni-oxide [IF1(a)] on La—Cu-oxide which had been prepared by decomposing nitrates of La(+3) [Johnson Matthey] and Cu(+2) [Fisher] with a La:Cu molar ratio of 2:1 and heated at 1,000° C. for 24 hours. Level of preparation: 6 grams. |
| IH | Pt/Sr—Ti-oxide: 1% Pt deposited on Sr—Ti-oxide [Pfaultz & Bauer] using the method described for catalyst formula 1A1. |
| IJ | Pt/La—Fe-oxide: 0.4% Pt was deposited on La—Fe-oxide using method similar to preparing catalyst formula IF1. La—Fe-oxide is prepared by the decomposition of nitrates of La(+3) [Johnson Matthey] and Fe(+3) using a La:Fe molar ratio of 1:1 which is then heated to 900° C. for 24 hours. Level of preparation: 10 grams. |
| IK | La—Co-oxide: La—Co-oxide is prepared by the decomposition of nitrates of La(3+) [Johnson & Matthey] and Co(2+) [Fredrick Smith Co.] using a La:Co molar ratio of 1:1 and then heating the preparation at 1,100° C. for 24 hours. Level of preparation: 10 g. |

It will be recognized and appreciated that while formulation Nos. 1A1-1A4 are different molecular ratios of one mixture; and formulations such as Nos. IB and IC are each comprised of different materials in admixture—Nos. ID1, ID2, and ID3 are differently prepared mixtures of the same formulation and ratio mixture. This is also true for formulation IE1 and IE2.

Relative Activity Of The Catalyst Formulations

For purposes of having a more objective standard by which to measure and evaluate the kinetic activity of the individual catalyst formulations, the following bases was employed.

Relative Activity (RA) =

$$\frac{\% \text{ NO decomposed over catalyst at temperature (T)}}{\% \text{ NO decomposed over Pt/Ti-oxide [IA1] at } 400° \text{ C.}}$$

Space velocity = 3,600/residence time (sec)
$(hr^{-1})$

Note: The NO decomposition using 1% NO in nitrogen at a residence time of 0.24 second is used as an activity index reference and the relative activity determined with Pt/Ti-oxide [IA1] as a standard. The NO decomposition activity for Pt/La-Ni-oxide (IF1) attains a plateau at this residence time (i.e., the % NO decomposed remains essentially constant with increasing residence time above 0.24 second; space velocity ≦15,000 $hr^{-1}$). Further, the NO activity for the platinum/rare-earth metal oxide/transition metal oxide mixtures has a plateau region very close to this value, while the plateau is not attained at this value for the other systems.

EXPERIMENT 1

Identification of Subclass I Catalysts

This experiment employed 1% NO in $N_2$ as the introductory gaseous stream which was combined with the various catalytic formulation at ambient environmental pressure and at temperatures held either at 25° C. or 400° C. The results are given by Table E2 below.

TABLE E2

| Preparation Number | Catalyst Formula | T = 25° C. % NO dec | RA | T = 400° C. % NO dec. | RA |
|---|---|---|---|---|---|
| IA1 | Pt/Ti-oxide | 27 | 0.84 | 32 | 1.00 |
| IB | Pt/Fe-oxide | 10 | 0.31 | 10 | 0.25 |
| IC | Cu—Ni—Al-oxide | Tr | 0.01 | 14 | 0.44 |
| ID1 | Cu—Ni—Ti-oxide | 15 | 0.48 | 19 | 0.59 |
| ID2 | Cu—Ni—Ti-oxide | 15 | 0.48 | 20 | 0.63 |
| ID3 | Cu—Ni—Ti-oxide | 15 | 0.48 | 16 | 0.50 |
| IE1 | La—Ni-oxide | 7 | 0.22 | 7 | 0.22 |
| IE2 | La—Ni-oxide | Tr | 0.0 | 15 | 0.47 |
| IF1 | Pt/La—Ni-oxide | 52 | 1.63 | 95 | 2.97 |
| IF2 | Pt/La—Ni-oxide | Tr | 0.0 | 57 | 1.78 |
| IG | Pt/La—Cu-oxide | Tr | 0.0 | 74 | 2.31 |

Tr = trace amount

SUMMARY AND CONCLUSIONS

At ambient conditions (25° C.) with the introductory gaseous stream at a space velocity of 15,000/hr, the catalyst formulations evaluated revealed that Nos. IF1 [Pt/La-Ni-oxide] was the best with a relative activity of 1.63 and was followed by No. IA1 [Pt/Ti-oxide] with a relative activity of 0.84. At a reaction temperature of 400° C., Pt containing catalysts with titanium oxide [No. IA1] and with rare-earth metal oxides [Nos. IF1, IF2, and IG] were best with relative activities greater than 1.0. The formulations of Nos. ID1, ID2, and ID3 [Cu-Ni-oxide] were the best non-platinum containing catalysts with relative activities in the range of 0.5. In each instance, also, nitrogen and oxygen were identified as the sole reaction products in varying amounts.

EXPERIMENT 2

Studies of Pt/La-Ni-oxide

The effect of the components which are typically present in jet exhausts on the activity formulation Nos. IF1(a), IF1(b) and (IF1(c ) [Pt/La-Ni-oxide] was studied in the continuous flow reactor apparatus of FIG. 1 by mixing the individual feed components with 1% NO in $N_2$. The major results obtained are given by FIGS. 2-4 and summarized below:

(a) The No. IF1 formulated catalyst exhibited steady activity of 66% over 8 hours towards NO decomposition in the presence of 25% $CO_2$ at 300° C. and a residence time of 0.1 second (space velocity of 36,000 $hr^{-1}$). The presence of $CO_2$ did not affect the activity.

(b) No appreciable change in activity of the IF1 catalyst was observed in the presence of 25% $CO_2$ and 1% $H_2O$ vapor at 300° C. and a residence time of 0.1 second. Although a 30% variation in activity was noticed with time around 4-6 hours, the No. IF1 catalyst regained its normal activity by 8 hours and maintained at least 62% conversion. (c) Addition of 24% air (5% $O_2$) did not have any significant effect on the NO decomposition activity of the No. IF1 catalyst at 330° C. at a residence time of 0.1 second. Under this condition, 99% of 0.76% NO decomposed as determined by the disappearance of NO. Only traces of $NO_2$ was observed intermittently; and at times the concentration of $NO_2$ ranged from 2-4% of 1% NO. Further, a decrease in residence time from 0.1 to 0.05 second (space velocity of 72,000 $hr^{-1}$) decreased the activity from 99% to 70%.

EXPERIMENTAL SERIES II

Subclass II Catalysts

A variety of experiments were undertaken to empirically evaluate catalytic formulations which were conditioned by exposure to carbon monoxide for a predetermined time period in comparison to identical formulations which were not preconditioned in this manner prior to use.

PREPARATION OF CO CONDITIONED CATALYSTS

For comparison purposes, two different formulations were prepared as given by Table E3 below.

TABLE E3

| Formula Number | Procedural Steps |
|---|---|
| IIA | La—Ni-oxide: 0.2 g of La—Ni-oxide (IE1) treated with flowing 30% CO in $N_2$ at 300° C. for 30 minutes inside the microreactor prior to use. |
| IIB | Cu—Ni—Ti-oxide: 0.2 g of Cu—Ni—Ti-oxide (ID1) was treated at 400° C. with flowing 30% CO in $N_2$ within the reactor for 30 minutes prior to use. |

EXPERIMENT 3

Decomposition And Relative Activities

A comparison evaluation was made between the nonconditioned catalysts (Nos. ID1-ID3 and IE1) described within Experimental Series I and their CO conditioned counterparts (Nos. IIA and IIB) under identical reaction conditions. The introductory gaseous stream contained 1% NO in $N_2$ which was supplied at ambient pressure and at temperatures of either 25° C. or 400° C. The results are given by Table E4 below.

TABLE E4

| Preparation Number | Catalyst Formula | T = 25° C. | | T = 400° C. | |
|---|---|---|---|---|---|
| | | % NO dec. | RA | % NO dec. | RA |
| ID1 | Cu—Ni—Ti-oxide | 15 | 0.48 | 19 | 0.59 |
| ID2 | Cu—Ni—Ti-oxide | 15 | 0.48 | 20 | 0.63 |
| ID3 | Cu—Ni—Ti-oxide | 15 | 0.48 | 16 | 0.50 |
| IIB* | Cu—Ni—Ti-oxide | 60 | 1.88 | 65 | 2.03 |
| IE1 | La—Ni-oxide | 7 | 0.22 | 7 | 0.22 |
| IE2 | La—Ni-oxide | 0 | 0 | 15 | 0.47 |
| IA* | La—Ni-oxide | N/A | N/A | 100 | 3.13 |

N/A = not available
* = CO conditioned catalyst

SUMMARY AND CONCLUSIONS

As the data of Table E4 reveals, conditioned formula No. IIB [Cu-Ni-Ti-oxide] was the outstanding catalyst with a relative activity of 1.88 at 25° C. and a space velocity of 15,000 hr$^{-1}$. Other Cu-Ni-Ti-oxide formulations which were not preconditioned [Nos. ID1, ID2, and ID3] showed moderate activity for the decomposition of NO. In comparison, the results obtained at 400° C. showed that all the conditioned and non-conditioned formulations tested were active in meaningful degree. Clearly, conditioned formula No. IIB, Cu-Ni-Ti-oxide, with a relative activity of 2.03 and conditioned formulation No. IIA, La-Ni-oxide, with a relative activity of 3.13 were the best among the catalysts evaluated. In all instances, however, the reaction products yielded by catalysis were nitrogen and oxygen regardless of which formulation was employed as the catalyst.

EXPERIMENTAL SERIES III

Subclass III Catalysts

An alternative series of experiments were conducted to demonstrate and evaluate the catalysts, preparations, and formulations previously listed within Tables E1 and E3 when these were combined with carbon monoxide as a co-reactant in the presence of NO. Of particular interest are those catalyst formulations which do not comprise any noble metal as a component part; and those preparations which were previously demonstrated via Table E2 to exhibit a NO$_x$ decomposition capability which was less than about 35% quantitatively in the absence of carbon monoxide within the introductory gaseous stream.

EXPERIMENT 5

Decomposition In The Presence Of 30% Carbon Monoxide

In this experiment, some non-conditioned and preconditioned catalysts prepared as disclosed within within Tables E1 and E3 were exposed individually in the continous-flow reaction apparatus to an introductory, gaseous stream composed of 30% carbon monoxide (CO), 0.7% nitric oxide (NO), and 69.3% nitrogen ($N_2$) with a space velocity of 15,000 hr$^{-1}$. The reaction temperature was held at 200° C. at ambient environment pressure. The observed results are summarized within Table E5 below.

TABLE E5

| Preparation Number | Catalyst Formula | % NO Converted | Relative Activity |
|---|---|---|---|
| IA | Pt/Ti-oxide | 35 | 1.00 |
| IC | Cu—Ni—Al-oxide | 100 | 2.86 |
| ID1 | Cu—Ni—Ti-oxide | 41 | 1.17 |
| ID2 | Cu—Ni—Ti-oxide | 34 | 0.97 |
| ID3 | Cu—Ni—Ti-oxide | 40 | 1.14 |
| IIB | Cu—Ni—Ti-oxide* | 65 | 1.85 |
| IB | Pt/Fe-oxide | 90+ | 2.57 |

*Subclass II catalyst previously conditioned with carbon monoxide prior to use as disclosed by Experiment 4 above.

SUMMARY AND CONCLUSIONS

The observed results provided by Table E5 are clearly unique and unusual. All of the catalyst preparations were outstanding in their individual ability to convert NO. Even the least effective catalysts, non-conditioned formulation No. ID2 [Cu-Ni-Ti-oxide] and formulation No. IA [Pt/Ti-oxide] showed NO conversion rates of 34% and 35% quantitatively. Note also that the CO preconditioned formulation No. IIB [Cu-Ni-Ti-oxide] converted 65% of the available NO. The best of this series, however, were non-conditioned formulation Nos. IC [Cu-Ni-Al-oxide] and IB [Pt/Fe-oxide] whose abilities to convert NO exceeded 90% quantitatively.

In addition, each instance of catalytic conversion using any of the formulations generated reaction products which were all environmentally compatible. Although the amounts varied considerably with each catalytic formulation under test, gaseous nitrogen, oxygen, carbon dioxide, and residual carbon monoxide were consistently yielded.

EXPERIMENT 6

Relative Activity Of Catalysts Based On Temperature

This experiment was performed to identify the ranking or order of the catalyst formulations listed within Tables E1 and E3 previously herein with respect to their ability to convert 0.7% NO in the presence of 30% CO and 69.3% $N_2$. Each catalyst formulation under test was evaluated at increasing temperatures to determine empirically that optimal temperature at which more than 90% of the NO was decomposed. The continuous flow reactor was held at temperatures between 200°–400° C. at ambient pressure and with a space velocity of 15,000 hr$^{-1}$. The results are summarized by Table E6 below.

TABLE E6

| Preparation Number | Catalyst Formulation | Temperature (°C.) | NO Percentage Converted |
|---|---|---|---|
| IC | Cu—Ni—Al-oxide | 200 | >90% |
| IB | Pt/Fe-oxide | 240 | >90% |
| ID1 | Cu—Ni—Ti-oxide | 290 | >90% |
| ID3 | Cu—Ni—Ti-oxide | 290 | >90% |
| IIB* | Cu—Ni—Ti-oxide* | 290 | >90% |
| IE1 | La—Ni-oxide | 300 | >90% |
| IA | Pt/Ti-oxide | 310 | >90% |
| ID2 | Cu—Ni—Ti-oxide | 390 | >90% |

*Subclass II catalyst preconditioned with carbon monoxide.

EXPERIMENT 7

Effect Of Lower Temperatures Upon NO Conversion

This experiment evaluated the effects of lower temperatures upon the conversion rates of NO by some of the catalyst preparations and formulations listed by Tables E1 and E3 previously after reaction with an introductory gaseous stream comprising 0.7% NO, 21%–30% CO, and 69.3–78.3% $N_2$. 0.2 grams of each catalyst formulation was deposited within the continuous-flow reactor for subsequent reaction at temperatures ranging from 25°–400° C.; each catalytic reaction then proceeded at ambient environmental pressure with a space velocity of 15,000 $hr^{-1}$ or greater. The reaction results for the individual catalyst formulations are summarized via Tables E7 to E10 below.

TABLE E7

No. IA1 [Pt/Ti-oxide]

| Reaction Temperature (°C.) | Percent NO* Conversion | Percent $CO_2$ in Effluent |
|---|---|---|
| 25 | 34% | 0.1 |
| 100 | 35% | 0.3 |
| 210 | 35% | 0.4 |
| 310 | 89% | 0.59 |
| 380 | 100% | 0.69 |

*30% CO in introductory gaseous stream

TABLE E8

No. ID1 [Cu—Ni—Ti-oxide]

| Reaction Temperature (°C.) | Percent NO* Converted | Percent $CO_2$ in Effluent |
|---|---|---|
| 25 | 19% | 0.02 |
| 110 | 33% | 0.26 |
| 200 | 41% | 0.38 |
| 290 | 100% | 0.65 |

*30% CO in introductory gaseous stream

TABLE E9

No. IC [Cu—Ni—Al-oxide]

| Reaction Temperature (°C.) | Percent NO* Converted | Percent $CO_2$ in Effluent |
|---|---|---|
| 25 | 29% | 0.19 |
| 104 | 47% | 0.52 |
| 158 | 77% | 0.74 |
| 200 | 95% | 0.85 |
| 257 | 100% | 0.96 |

*21% CO in introductory gaseous stream

TABLE E10

No. IB [Pt/Fe-oxide]

| Reaction Temperature (°C.) | Percent NO* Converted | Percent $CO_2$ in Effluent |
|---|---|---|
| 25 | 16% | 0.01 |
| 100 | 25% | 0.26 |
| 240 | 100% | 0.93 |

*28% CO in introductory gaseous stream

SUMMARY AND CONCLUSIONS

As the data of Tables E7–E10 reveal, formulation Nos. IC [Cu-Ni-Al-oxide], IB [Pt/Fe-oxide], and IIB [Cu-Ni-Ti-oxide] were the better catalysts at 200° C. with individual relative activities greater than 1.5 when the introductory gaseous stream was supplied at a space velocity of 15,000 $hr^{-1}$. Note that all of the catalysts evaluated converted more than 90% of the available NO in the introductory gaseous stream at temperatures less than 300° C. with the exception of No. ID2 [Cu-Ni-Ti-oxide] which reached this NO conversion percentage at 390° C.

The studies at varying temperatures between 25°–400° C. also clearly showed that all the catalysts demonstrated gradual increases in NO activity and conversion rate with increasing temperature; and that each catalyst formulation had an individual optimal temperature, characteristic unto itself, at which a sharp increase in catalytic activity leading to a complete conversion and removal of the NO was observed.

In addition, analysis of the generated reaction products routinely showed that carbon dioxide was the dominant result with only very small amounts of oxygen being released. Thus, regardless of which formulation was employed, the reaction products were only nitrogen, carbon dioxide, oxygen, and residual carbon monoxide.

EXPERIMENT 8

Decomposition Of NO In The Presence Of Minimal Volumes Of Carbon Monoxide

A variety of NO conversion studies were conducted to determine the effect of minimal carbon monoxide volumes upon the rate of NO removal. The formulations evaluated were those listed within Tables E1 and E3 previously. The tests were carried out using the continuous flow reactor apparatus of FIG. 1 using 0.2 grams of the individual catalyst preparation. The ratio of NO:CO was varied from 1:1 to 4:1 by varying the flow rates of 3.5% NO in $N_2$ and 3.5% CO in $CO_2$ and by maintaining a space velocity of either 15,000 $hr^{-1}$ or 21,000 $hr^{-1}$. The reaction was conducted at 400° C. and, alternatively, at 480° C. or 500° C. at ambient environmental pressure. Lastly, the introductory gaseous stream supplied for reaction routinely contained about 0.07% oxygen which was provided via water vapor. The results in summary form for each catalyst preparation individually are given by Tables E11–E24 below.

TABLE E11

No. ID1 [Cu—Ni—Ti-oxide]

| NO:CO Ratio | Reaction Temperature (°C.) | Mole % of NO Present | Quantity* of NO Converted |
|---|---|---|---|
| 1 | 400 | 1.75 | 95% |
| 2 | 400 | 2.3 | 50% |
| 3 | 400 | 2.6 | 26% |
| 4 | 400 | 2.8 | 20% |
| 1 | 500 | 1.75 | 90% |
| 2 | 500 | 2.3 | 51% |
| 3 | 500 | 2.6 | 32% |
| 4 | 500 | 2.8 | 25% |

*Space velocity maintained at 15,000 $hr^{-1}$.

TABLE E12

No. IC [Cu—Ni—Al-oxide]

| NO:CO Ratio | Reaction Temperature (°C.) | Mole % of NO Present | Quantity* of NO Converted |
|---|---|---|---|
| 1 | 400 | 1.75 | 95% |
| 2 | 400 | 2.3 | 52% |
| 3 | 400 | 2.6 | 35% |
| 4 | 400 | 2.8 | 31% |
| 1 | 480 | 1.75 | 91% |
| 2 | 480 | 2.3 | 51% |

TABLE E12-continued

No. IC [Cu—Ni—Al-oxide]

| NO:CO Ratio | Reaction Temperature (°C.) | Mole % of NO Present | Quantity* of NO Converted |
|---|---|---|---|
| 3 | 480 | 2.6 | 32% |

*Space velocity maintained at 15,000 hr⁻¹.

TABLE E13

No. IE1 [La—Ni-oxide]

| NO:CO Ratio | Reaction Temperature (°C.) | Mole % of NO Present | Quantity* of NO Converted |
|---|---|---|---|
| 1 | 400 | 1.75 | 75% |
| 2 | 400 | 2.3 | 44% |
| 3 | 400 | 2.6 | 28% |
| 4 | 400 | 2.8 | 20% |
| 1 | 480 | 1.75 | 82% |
| 2 | 480 | 2.3 | 55% |

*Space velocity maintained at 15,000 hr⁻¹.

TABLE E14

No. IA1 [Pt/Ti-oxide]

| NO:CO Ratio | Reaction Temperature (°C.) | Mole % of NO Present | Quantity* of NO Converted |
|---|---|---|---|
| 1 | 400 | 1.75 | 100% |
| 2 | 400 | 2.3 | 76% |
| 3 | 400 | 2.6 | 60% |
| 4 | 400 | 2.8 | 43% |
| 1 | 500 | 1.75 | 100% |
| 2 | 500 | 2.3 | 72% |
| 3 | 500 | 2.6 | 44% |
| 4 | 500 | 2.8 | 32% |

*Space velocity maintained at 15,000 hr⁻¹.

TABLE E15

No. IA2 [Pt/Ti-oxide]

| NO:CO Ratio | Reaction Temperature (°C.) | Mole % of NO Present | Quantity* of NO Converted |
|---|---|---|---|
| 1 | 400 | 1.75 | 100% |
| 2 | 400 | 2.3 | 69% |
| 3 | 400 | 2.6 | 53% |
| 4 | 400 | 2.8 | 38% |
| 1 | 500 | 1.75 | 100% |
| 2 | 500 | 2.3 | 73% |
| 3 | 500 | 2.6 | 53% |
| 4 | 500 | 2.8 | 38% |

*Space velocity maintained at 15,000 hr⁻¹.

TABLE E16

No. IA3 [Pt/Ti-oxide]

| NO:CO Ratio | Reaction Temperature (°C.) | Mole % of NO Present | Quantity* of NO Converted |
|---|---|---|---|
| 1 | 400 | 1.75 | 100% |
| 2 | 400 | 2.3 | 77% |
| 3 | 400 | 2.6 | 59% |
| 4 | 400 | 2.8 | 38% |
| 1 | 500 | 1.75 | 100% |
| 2 | 500 | 2.3 | 71% |
| 3 | 500 | 2.6 | 50% |
| 4 | 500 | 2.8 | 32% |

*Space velocity maintained at 15,000 hr⁻¹.

TABLE E17

No. IA4 [Pt/Ti-oxide]

| NO:CO Ratio | Reaction Temperature (°C.) | Mole % of NO Present | Quantity* of NO Converted |
|---|---|---|---|
| 1 | 400 | 1.75 | 100% |
| 2 | 400 | 2.3 | 79% |
| 3 | 400 | 2.6 | 60% |
| 4 | 400 | 2.8 | 45% |
| 1 | 500 | 1.75 | 100% |
| 2 | 500 | 2.3 | 71% |
| 3 | 500 | 2.6 | 56% |

*Space velocity maintained at 15,000 hr⁻¹.

TABLE E18

No. IE2 [La—Ni-oxide]

| NO:CO Ratio | Reaction Temperature (°C.) | Mole % of NO Present | Quantity* of NO Converted |
|---|---|---|---|
| 1 | 500 | 1.75 | 74% |
| 2 | 500 | 2.33 | 28% |
| 3 | 500 | 2.63 | 20% |
| 4 | 500 | 2.80 | 12% |

*Space velocity maintained at 21,000 hr⁻¹.

TABLE E19

No. IF1 [Pt/La—Ni-oxide]

| NO:CO Ratio | Reaction Temperature (°C.) | Mole % of NO Present | Quantity* of NO Converted |
|---|---|---|---|
| 1 | 400 | 1.75 | 100% |
| 2 | 400 | 2.33 | 82% |
| 3 | 400 | 2.63 | 60% |
| 4 | 400 | 2.80 | 48% |
| 1 | 500 | 1.75 | 100% |
| 2 | 500 | 2.3 | 80% |
| 3 | 500 | 2.6 | 58% |

*Space velocity maintained at 21,000 hr⁻¹.

TABLE E20

No. IF2 [Pt/La—Ni-oxide]

| NO:CO Ratio | Reaction Temperature (°C.) | Mole % of NO Present | Quantity* of NO Converted |
|---|---|---|---|
| 1 | 400 | 1.75 | 100% |
| 2 | 400 | 2.3 | 71% |
| 3 | 400 | 2.6 | 54% |
| 4 | 400 | 2.8 | 42% |
| 1 | 500 | 1.75 | 100% |
| 2 | 500 | 2.3 | 62% |
| 3 | 500 | 2.6 | 47% |
| 4 | 500 | 2.8 | 38% |

*Space velocity maintained at 21,000 hr⁻¹.

TABLE E21

No. IG [Pt/La-Cu-oxide]

| NO:CO Ratio | Reaction Temperature (°C.) | Mole % of NO Present | Quantity* of NO Converted |
|---|---|---|---|
| 1 | 400 | 1.75 | 100% |
| 2 | 400 | 2.3 | 47% |
| 2.75 | 400 | 2.5 | 39% |
| 4 | 400 | 2.8 | 28% |
| 1 | 500 | 1.75 | 100% |
| 2 | 500 | 2.3 | 48% |
| 2.75 | 500 | 2.5 | 40% |
| 4 | 500 | 2.8 | 30% |

*Space velocity maintained at 21,000 hr⁻¹.

TABLE E22

| | No. IJ [Pt/La—Fe-oxide] | | |
|---|---|---|---|
| NO:CO Ratio | Reaction Temperature (°C.) | Mole % of NO Present | Quantity of NO Converted* |
| 1 | 400 | 1.75 | 100% |
| 2 | 400 | 2.3 | 80% |
| 3 | 400 | 2.6 | 63% |
| 4 | 400 | 2.8 | 46% |
| 1 | 500 | 1.75 | 100% |
| 2 | 500 | 2.3 | 67% |
| 3 | 500 | 2.6 | 53% |
| 4 | 500 | 2.8 | 37% |

*Space velocity maintained at 21,000 hr$^{-1}$.

TABLE E23

| | No. IK [La—Co-oxide] | | |
|---|---|---|---|
| NO:CO Ratio | Reaction Temperature (°C.) | Mole % of NO Present | Quantity of NO Converted* |
| 1 | 400 | 1.75 | 42% |
| 2 | 400 | 2.3 | 37% |
| 3 | 400 | 2.6 | 33% |
| 1 | 500 | 1.75 | 93% |
| 2 | 500 | 2.3 | 76% |
| 3 | 500 | 2.6 | 55% |
| 4 | 500 | 2.8 | 41% |

*Space velocity maintained at 21,000 hr$^{-1}$.

TABLE E24

| | No. IH [Pt/Sr—Ti-oxide] | | |
|---|---|---|---|
| NO:CO Ratio | Reaction Temperature (°C.) | Mole % of NO Present | Quantity of NO Converted* |
| 1 | 400 | 1.75 | 100% |
| 2 | 400 | 2.3 | 82% |
| 3 | 400 | 2.6 | 81% |
| 4 | 400 | 2.8 | 50% |
| 1 | 500 | 1.75 | 100% |
| 2 | 500 | 2.3 | 75% |
| 3 | 500 | 2.6 | 73% |
| 4 | 500 | 2.8 | 41% |

*Space velocity maintained at 15,000 hr$^{-1}$.

SUMMARY AND CONCLUSIONS

From the data of Tables E11-E24, it will be recognised that all the formulations catalytically converted substantial percentage quantities of NO which typically exceeded 35% and often approached 100% at 400° or 500° C. In each instance, the percentage of NO converted varied with the precise NO:CO ratio (between 1 and 4) and the temperature of reaction.

In addition, molecular oxygen ($O_2$) was always present in varying amounts as a reaction product of the catalysis. Oxygen ($O_2$) was obtained in the range from 0.1-0.6% from all the formulations except Nos. IC [Cu-Ni Al-oxide], ID1 [Cu-Ni-Ti-oxide], IE2 [La-Ni-oxide], and IG [Pt/La-Cu-oxide]. The greatest quantities of oxygen were catalytically produced by platinum-containing formulation Nos. IA1-IA4 [Pt/Ti-oxide], IF1 and IF2 [Pt/La-Ni-oxide], IH Pt/Sr-Ti-oxide], and IJ [Pt/La-Fe oxide].

In addition to the presence of oxygen in the gaseous discharge after catalytic reaction, varying quantities of nitrogen, carbon dioxide, and residual water vapor and carbon monoxide were detected. Although the amounts of each reaction product varied markedly among the different formulations tested, each instance of NO catalytic conversion generated only environmentally compatible reaction products.

EXPERIMENT 9

Decomposition Of NO In The Presence Of Variable Volumes Of Carbon Monoxide

A variety of NO conversion studies were conducted to further determine the effect of varying volumes of carbon monoxide. The formulations evaluated were some of those listed previously within Table E1. The tests were carried out using the continous flow reactor apparatus of FIG. 1 using 0.2 grams of the individual catalyst preparation. A set of reactions were performed by mixing various proportions of 3.5% NO in $N_2$ and 3.5% CO in $CO_2$ at ambient pressure. The NO/CO ratio was varied between 1-5 keeping a total flow rate of 10 ml/min. The temperature for the reactions was varied progresively between 25°-505° C.

Accordingly, where the introductory gaseous stream provided a NO:CO ratio of 1.0, the gasous mixture comprised 1.7% CO, 1.7% NO, 47.8% $CO_2$, 47.2% $N_2$, and 1.0% water vapor. Similarly where the NO:CO ratio was 2.0, the introductory gaseous stream comprised 1.1% CO, 31.6% $CO_2$, 2.3% NO, 64.0% $N_2$, and 1.0% water vapor. The results in summary form for each catalyst preparation are given by Table E25 below.

TABLE E25

| Catalyst No. | Formula | NO:CO Ratio | Temp. (°C.) | % $O_2$ | % NO Converted |
|---|---|---|---|---|---|
| IK | La—Co-oxide | 2.0* | 103 | 0 | 0 |
| | | 2.0* | 207 | 0 | 0 |
| | | 2.0* | 297 | 0 | Tr |
| | | 2.0* | 350 | Tr | 15.3 |
| | | 2.0* | 375 | 0.36 | 63.0 |
| | | 2.0* | 400 | 0.47 | 74.6 |
| | | 2.0* | 505 | 0.51 | 86.8 |
| IF1(a) | Pt/La—Ni-oxide | 2.01$^f$ | 23.1 | Tr | Tr |
| | | 2.01$^f$ | 98 | Tr | Tr |
| | | 2.01$^f$ | 200 | Tr | 20 |
| | | 2.01$^f$ | 235 | 0.46 | 90 |
| | | 2.01$^f$ | 290 | 0.60 | 96 |
| | | 2.01$^f$ | 348 | 0.60 | 96 |
| | | 2.01$^f$ | 416 | 0.52 | 95.3 |
| IG | Pt/La—Ni-oxide | 1.0$^f$ | 48 | 0 | 0 |
| | | 1.0$^f$ | 142 | 0 | 6 |
| | | 1.0$^f$ | 212 | 0 | 16 |
| | | 1.0$^f$ | 298 | 0 | 90 |
| | | 1.0$^f$ | 360 | 0 | 100 |
| | | 1.0$^f$ | 500 | 0 | 100 |
| IH | Pt/Sr—Ti-oxide | 2.03* | 195 | Tr | 7.9 |
| | | 2.03* | 247 | 0.33 | 68 |
| | | 2.03* | 305 | 0.38 | 80 |
| | | 2.03* | 415 | 0.37 | 82 |
| | | 2.03* | 500 | 0.19 | 75 |

Tr = trace amount
* = Space velocity was 21,000 hr$^{-1}$.
$^f$ = Space velocity was 15,000 hr$^{-1}$.

SUMMARY AND CONCLUSIONS

The data of Table E25 involving the progressive variation of temperature between 25°-505° C. clearly showed that the peak activities with NO conversion greater than 90% were obtained at temperatures 220°-300° C. for No. IF1(a) [Pt/La-Ni-oxide] and No. IH [Pt/Sr-Ti-oxide]. No. IK [La-Co-oxide] exhibited a progressive increase in activity from 15.3% at 350° C. to 87% at 505° C.

EXPERIMENT 10

Effect Of Space Velocity Upon NO Conversion In The Presence Of Carbon Monoxide Another set of experiments were conducted to determine the effect of varying space velocity upon NO conversion using a fixed NO:CO ratio of 2.0 in the introductory gaseous stream. The formulations evaluated were those listed within Table E1 previously. The tests were performed using the continous flow reactor apparatus of FIG. 1 using 0.2 grms of the individual catalyst. The introductory gaseous stream in each instance provided 1.1% CO, 2.3% NO, 31.6% $CO_2$, 64% $N_2$, and 1% water vapor for catalytic conversion at ambient pressure. The space velocities were varied between 15,000–210,000 $hr^{-1}$ at temperatures between 250°–500° C. by addition of helium to the gas mixture. The results in summary form each each catalyst preparation are given by Table E26 below.

TABLE E26

| Catalyst No. | Formula | Temp. (°C.) | Space Velocity Range | % NO Converted |
|---|---|---|---|---|
| IA1 | Pt/Ti-oxide | 400 | 15,000–150,000 $hr^{-1}$ | 82 ± 1 |
| IA2 | Pt/Ti-oxide | 400 | 15,000–150,000 $hr^{-1}$ | 70 |
| IA3 | Pt/Ti-oxide | 400 | 15,000–150,000 $hr^{-1}$ | 80 |
| IA4 | Pt/Ti-oxide | 400 | 15,000–150,000 $hr^{-1}$ | 81 |
| IJ | Pt/La—Fe-oxide | 400 | 21,000–210,000 $hr^{-1}$ | 81 ± 1 |
| IF1(a) | Pt/La—Ni-oxide | 400 | 21,000–210,000 $hr^{-1}$ | 80 |
| IF2 | Pt/La—Ni-oxide | 400 | 21,000–43,000 $hr^{-1}$ | 70 |
| IG | Pt/La—Cu-oxide | 400 | 21,000–210,000 $hr^{-1}$ | 50 ± 2 |
| IH | Pt/Sr—Ti-oxide | 250 | 15,000–150,000 $hr^{-1}$ | 70 ± 1 |
| IK | La—Co-oxide | 500 | 21,000–210,000 $hr^{-1}$ | 74 |
| IE2 | La—Ni-oxide | 500 | 21,000–210,000 $hr^{-1}$ | 65 ± 2 |

SUMMARY AND CONCLUSIONS

The observed results shows that catalytic reaction and NO conversion was independent of space velocity within the range of 15,000–210,000 $hr^{-1}$ for all the tested individual reparations at temperatures where peak catalytic activities were obtained.

EXPERIMENT 11

Decomposition of NO In The Presence Of Methane

In this experiment, several non-conditioned catalyst formulations prepared as disclosed by Table E1 were exposed individually using the continous flow reactor apparatus of FIG. 1 to an introductory gaseous stream containing 9% methane ($CH_4$), 3.2% nitric oxide (NO), and 87.8% nitrogen. The amount of catalyst employed was 0.2 grams consistently; and the reaction temperature was varied from a low of 188° C. to a high of 555° C. at ambient pressure. The space velocity was also varied between 15,000–210,000 $hr^{-1}$ by adding helium to the gas mixture. The effect of methane as a specific coreactant and as a general representative of all CH-containing compounds was then empirically observed. The results are summarized by Tables E27 and E28 respectively.

TABLE E27

| Catalyst No. | Formula | Space Velocity ($hr^{-1}$) | Reaction Temp. (°C.) | % $CO_2$ Yielded (%) | % $O_2$ Yielded (%) | Quantity of NO Converted (%) |
|---|---|---|---|---|---|---|
| IA4 | Pt/Ti-oxide | 15,000 | 310 | 0.15 | Trace | 8 |
| IA4 | Pt/Ti-oxide | 15,000 | 351 | 0.18 | 0.06 | 13 |
| IA4 | Pt/Ti-oxide | 15,000 | 405 | 0.43 | 0.16 | 35 |
| IA4 | Pt/Ti-oxide | 15,000 | 454 | 1.00 | 0.31 | 83 |
| IA4 | Pt/Ti-oxide | 15,000 | 523 | 1.10 | 0.11 | 73 |
| IF1 | La—Ni-oxide | 21,000 | 188 | 0.05 | Trace | 7 |
| IF1 | La—Ni-oxide | 21,000 | 253 | 0.07 | Trace | 8 |
| IF1 | La—Ni-oxide | 21,000 | 306 | 0.10 | 0.32 | 23 |
| IF1 | La—Ni-oxide | 21,000 | 356 | 1.48 | 0.08 | 100 |
| IF1 | La—Ni-oxide | 21,000 | 411 | 1.55 | 0.05 | 100 |
| IF1 | La—Ni-oxide | 21,000 | 523 | 0.05 | 0.05 | 7 |
| IK | La—Co-oxide | 21,000 | 291 | Trace | 0 | Trace |
| IK | La—Co-oxide | 21,000 | 400 | Trace | Trace | Trace |
| IK | La—Co-oxide | 21,000 | 449 | Trace | Trace | Trace |
| IK | La—Co-oxide | 21,000 | 495 | 0.05 | 0.16 | 14 |
| IK | La—Co-oxide | 21,000 | 555 | 0.45 | 0.06 | 39 |

TABLE E28

| Catalyst No. | Formula | Reaction Temp. (°C.) | Space Velocity | Quantity of NO Converted |
|---|---|---|---|---|
| IA4 | [Pt/Ti-oxide] | 400 | 15,000 to 150,000 $hr^{-1}$ | 75 ± 3% |
| IF1 | [Pt/La—Ni-oxide] | 340 | 21,000 to 210,000 $hr^{-1}$ | 100% |

SUMMARY AND CONCLUSIONS

The data of Tables E27 and E28 demonstrates the marked enhancement of NO catalytic conversion when methane ($CH_4$) is present as a co-reactant in the introductory gaseous stream. Formulation No. IF1 [Pt/La-Ni-oxide] showed moderate NO conversion activity at temperatures close to 300° C. and attained maximum activity (100% conversion) at 356° C. In comparison, formulation No IA4 [Pt/Ti-oxide] exhibited its best activity at temperatures greater than 500° C. It will be recognized and appreciated also that the rate of NO catalytic conversion was independent of space velocity for the catalysts evaluated.

The present invention is not to be restricted in form nor limited in scope except by the claims appended hereto.

What we claim is:

1. A thermal catalytic method for decomposing oxides of nitrogen into environmentally compatible products, said method comprising the steps of:
   obtaining at least one solid catalyst comprising a noble metal and at least one material selected from the group consisting of a transition metal oxide and a rare-earth metal oxide;
   introducing a gaseous stream comprising at least one oxide of nitrogen to said solid catalyst in the absence of a reducing agent to form a reaction mixture;

maintaining said reaction mixture at ambient pressure and at a temperature of from 0° C. to 550° C., at a space velocity of from 15,000 to 150,000 hr$^{-1}$; and allowing said solid catalyst of said maintained reaction mixture to catalytically decompose substantial quantities of said oxide of nitrogen into environmentally compatible products.

2. The thermal catalytic method as recited in claim 1 wherein said catalyst comprises a transition metal oxide and a noble metal.

3. The thermal catalytic method as recited in claim 1 wherein said solid catalyst comprises a noble metal and a rare-earth metal oxide.

4. The thermal catalytic method as recited in claim 1 wherein said solid catalyst further comprises a Group III metal oxide.

5. The thermal catalytic method as recited in claim 1 wherein said solid catalyst further comprises an alkaline earth oxide.

6. The thermal catalytic method as recited in claim 1 wherein said solid catalyst further comprises a Group IV B metal oxide.

7. The thermal catalytic method as recited in claim 1 wherein said reaction mixture is maintained at ambient environmental temperature.

8. The thermal catalytic method as recited in claim 1 wherein said reaction mixture is maintained at a temperature ranging from 100°–550° C.

9. The thermal catalytic method as recited in claim 1 wherein said noble metal is selected from the group consisting of platinum, palladium, iridium, rhodium, osmium, and ruthenium.

10. The thermal catalytic method as recited in claim 1 wherein said tansition metal oxide is selected from the group consisting of titanium oxide, vanadium oxide, chromium oxide, manganese oxide, iron oxide, cobalt oxide, nickel oxide, and copper oxide.

11. The thermal catalytic method as recited in claim 1 wherein said rare-earth metal oxide is selected from the group consisting of lanthanium oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, and lutetium oxide.

12. The thermal catalytic method as recited in claim 4 wherein said Group III metal oxide is selected from the group consisting of aluminum oxide, gallium oxide, indium oxide, and thallium oxide.

13. The thermal catalytic method as recited in claim 5 wherein said alkaline-earth oxide is selected from the group consisting of magnesium oxide, calcium oxide, strontium oxide, and barium oxide.

14. The thermal catalytic method as recited in claim 6 wherein said Group IV B metal oxide is selected from the group consisting of scandium oxide and yttrium oxide.

15. The thermal catalytic method as recited in claim 1 wherein the catalyst comprises Pt/Ti-Oxide, Pt/La-Ni-Oxide or Pt/La-Cu-Oxide.

16. The thermal catalytic method as recited in claim 1 wherein the catalyst comprises Pt/La-Ni-Oxide.

* * * * *